July 10, 1956      L. E. BARTLETT      2,754,355

CREPE PAPER INSULATING ELEMENTS

Filed Feb. 8, 1952

Inventor
Lawrence E. Bartlett
by Joseph E. Kerwin
Attorney

United States Patent Office 2,754,355
Patented July 10, 1956

2,754,355

CREPE PAPER INSULATING ELEMENTS

Lawrence E. Bartlett, Bellevue, Pa., assignor to Allis-Chalmers Manufacturing Company, Milwaukee, Wis.

Application February 8, 1952, Serial No. 270,729

3 Claims. (Cl. 174—209)

This invention relates in general to improvements in electrical insulating elements. More particularly, the invention relates to improvements in such elements made from paper strips.

In electrical induction apparatus such as transformers and reactors in which there are winding stacks comprising many superposed disk coils, insulating distances required between adjacent coils or between groups of the coils are minimized by means of solid insulation. In such winding stacks the leakage distances are increased by providing flanged solid insulating elements of both angle and channel shapes to enclose the coils. The formation of suitable flanged angle or channel insulating elements into complete one piece rings is difficult, and joints or weak spots in those elements lessen the breakdown strength of the finished insulation. If joints between pieces of the insulation cannot be eliminated, they should provide as nearly perfect a fit as is possible.

It has been proposed that the complete ring of the insulating element be made by molding segments thereof, scarfing edge portions of those segments and joining the scarfed segments together. However, molding flanged layers of material of sufficient thickness for insulation is difficult and generally expensive or slow and may cause wrinkles and irregularities in the material. Also, joining the scarfed ends of the segments requires that the scarfed ends fit together well and the care necessary to make independently manufactured segments fit together well increases the possibility of the finished insulating element being dielectrically weak. Another method of molding insulating elements that has been proposed involves winding insulation on an annular mandrel to make a tubular wrapping, cutting the tubular wrapping, forcing it open to remove the mandrel from it, and placing the opened wrapping in a matrix which completely encloses and molds the wrapping into the desired shape. In such a method, opening the tubular wrapping and reshaping it in the matrix may result in the material being weakened and wrinkled, and involves costly handling of the material and the necessity for a special matrix for each size and shape of element.

In accordance with this invention the disadvantages of the prior known methods of forming one piece insulating elements are avoided and improved finished insulating elements having angle and channel cross section are economically and quickly made out of readily available material by winding strips of crepe paper on a mandrel so that the wound form can easily and inexpensively be bonded into a solid structure free of voids too large to retain insulating oil by capillary action. This improved, finished insulating element may be made without pressing the wound form between dies although, if desired, an easy, inexpensive pressing operation may be accomplished while the wound form is still on the mandrel without reshaping the wound form.

It is an object of this invention to provide improved laminated angle and channel shaped insulating elements of the closed ring type in which insulating oil is retained throughout by capillary action.

Another object of this invention is to provide flanged, ring shaped insulating elements formed of wrapped paper strips with the elements having a tubular wall reinforced in which the edges of the wrapped strip are prevented from loosening or fraying.

Objects and advantages other than those above set forth will be apparent from the following description when read in connection with the accompanying drawing in which.

Figure 1:
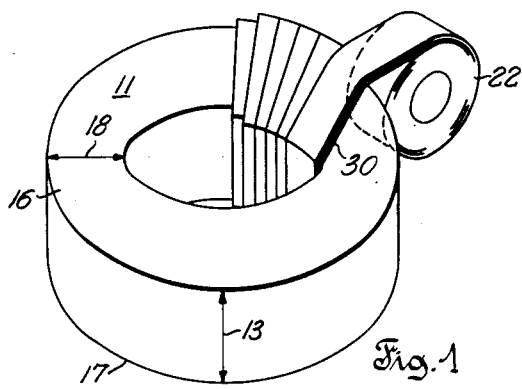
Fig. 1 is a perspective view illustrating a strip of insulating paper being wound on a ring shaped mandrel to make insulating elements in accordance with this invention.
Figure 2:
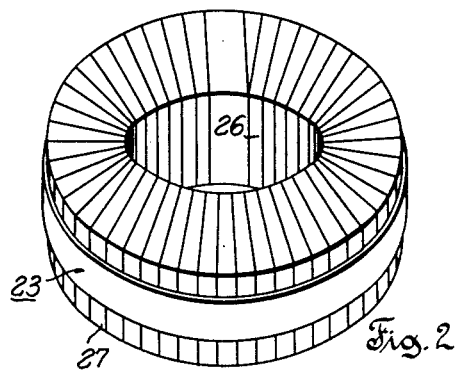
Fig. 2 is a perspective view of the form made of strips of insulation wound on the mandrel shown in Fig. 1, with the desired thickness of layered insulation and with a reinforcing circumferentially wrapped strip on the outer peripheral wall surface of the wound form.

A ring shaped mandrel 11 has dimensions such that finished insulating elements made on the mandrel will closely enclose the coil or group of coils with which those finished insulating elements are associated. While various sizes and dimensions of finished insulating elements can be made in accordance with this invention, it is intended that this invention shall be particularly adapted to insulating elements which comprise a solid ring or tubular part which is flanged laterally.

For making an insulating element 12 (Fig. 5) which has an angle shaped cross section, the axial length 13 of the mandrel 11 is twice the inside length 14 of tubular leg 15 of the insulating element 12, and the upper and lower flat ring shaped surfaces 16 and 17, respectively, of the mandrel have a radial width 18 equal to the inside length 19 of the lateral flange or side 21 of the insulating element 12. Two of these finished angles can be made simultaneously on such a mandrel which has a rectangular cross section.

Figures 11, 12:
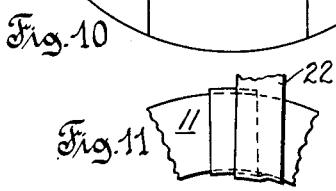
Fig. 11 is a plan view of part of the mandrel shown in Fig. 1 illustrating the preferred overlapped wrapping of a stretched strip of the crepe paper insulation.
Fig. 12 is a cross section of the wound form on a modified mandrel.

In forming these insulating angles a spool of suitable insulating paper 22, preferably crepe paper, is wound on the mandrel 11 by being wrapped by hand or by suitable machine about the cross section of the mandrel in substantially radial convolutions. Adjacent widths or convolutions of the crepe paper are overlapped approximately one half the width of the strip of paper as shown in Fig. 11. The overlap tapers across the upper and lower surfaces of the mandrel with the widest overlap at the inner edge thereof. The portion of a convolution overlapping an adjacent convolution is stretched to a greater extent than the nonoverlapping portion to cause the strip to be wound without wrinkles. This result is obtained when the strip is made of crepe paper, which can be stretched to a considerable extent before breaking. If necessary, successive layers of the insulating element are similarly wrapped until the desired thickness of insulation for the required dielectric strength of the element is obtained. After the desired thickness of insulation has been obtained, another strip 23 of the crepe paper is wound on the girth of the layered wrapping to make a wound form. This second strip has its lengthwise direction crosswise of the lengthwise direction of the previously wrapped strip and is applied to the portion of the outer surface of the tubular wall of that wrapping which is later to be cut, generally halfway of the length of the tubular wall. The resulting wound form has flat disk shaped upper and lower laminated walls 24, 25 and tubular inner and outer laminated walls 26, 27.

Figure 3:
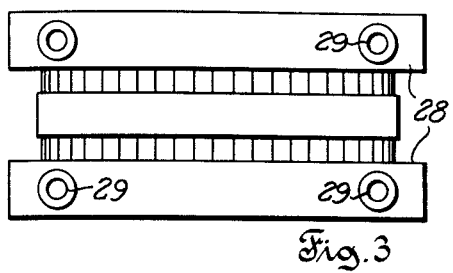
Fig. 3 is an elevation view of the wound form shown in Fig. 2 being pressed and heated between a pair of flat heated dies.
Figure 4:
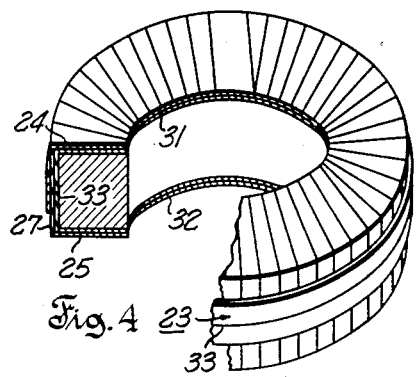
Fig. 4 is a perspective view similar to Fig. 2 showing part of the wound form with the inner tubular wall of the wound form removed in accordance with one of the steps of this invention.

The crepe paper in the wound form is bonded into a solid structure. This may be done by using strips of crepe paper previously coated with a suitable adhesive 30 (such as polyvinyl alcohol), wetting that crepe paper as it is wound on the mandrel, and drying the wound form. The bond may also be accomplished by having a thermoplastic adhesive on the crepe paper which will bond when heated either with or without pressure. If pressure is required the wound form wrapped in accordance with this invention need only be placed between a pair of dies 28 heated by suitable means such as steam coils 29. And as illustrated in Fig. 3 the dies need only abut the upper and lower surfaces of the wound form so that a single pair of dies can be utilized for different sizes of wound forms.

With the form wound of crepe paper which is stretched and tightly applied to the mandrel layer upon layer and with a reinforcing strip tightly wound on the outer tubular wall 27 of the wound form, the tubular walls of the form need not be pressed by the dies to provide a good bonded form and to prevent bulging of those walls.

Figure 5:
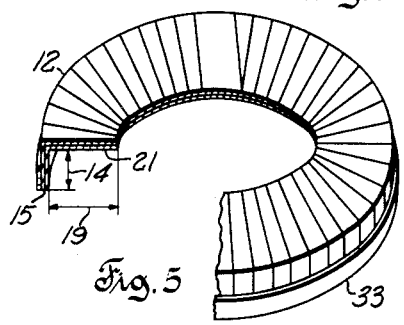
Fig. 5 is a perspective view of a finished ring shaped inwardly flanged angle type insulating element with part thereof removed to better illustrate the structure.

After the form has been bonded it is cut and removed from the mandrel without bending or deforming the bonded layers. In the instance when the angle shaped elements illustrated in Fig. 5 are made, the wound form is slit or cut through the bonded layers on two circular lines. One cut is made through the layers comprising the upper flat wall on line 31 and the other cut is made through the layers comprising the lower flat wall on line 32. These two circular cuts preferably align with the inner cylindrical surface of the mandrel. By thus cutting the wound form, the inner tubular wall 26 is disjoined from the wound form and removed from the mandrel.

Next the wound form is cut on line 33 which also defines a circle. This cut extends radially through the reinforcing strip and the layers of insulation at approximately the middle of the outer tubular wall 27 or at any other suitable location thereon. This cut separates the reinforcing strip into two parts with each part binding the girth of the edge portion of the tubular leg of each finished, solidly bonded ring shaped insulating angle.

The two finished ring shaped angle elements can be lifted from the mandrel after this last cutting operation.

Insulating elements having channel shaped cross section can also be made in accordance with this invention. While these elements may be of uninterrupted ring construction like the angle elements in which case the disk coils would have to be formed inside the channel, preferably they are cut into two or more segments after having been bonded into their finished shape. The cut segments can then easily be properly placed around the disk coil, and tightly and properly joined together without the need for special attention in making the joints or scarfing the edges as is necessary in joining independently molded segments.

Figure 6:
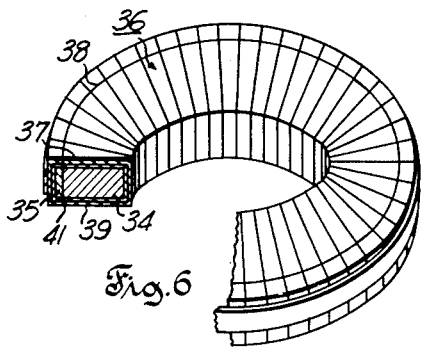
Fig. 6 is a perspective view of part of a wound form similar to that illustrated in Fig. 2 with the mandrel including a retaining ring so that a ring shaped channel element can be made in accordance with this invention.
Figure 10:
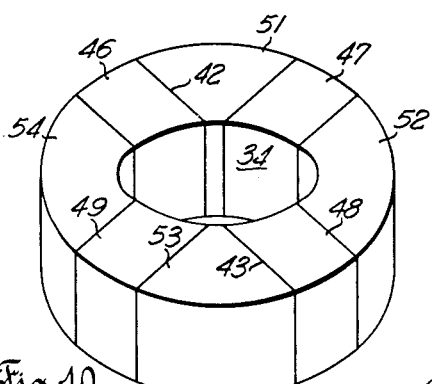
Fig. 10 is a perspective view of the mandrel showing how it may be sectionalized in order to be separated from the finished ring shaped channel elements.

These finished ring shaped channels, flanged inwardly or outwardly, can be made from the bonded wound form illustrated in Fig. 3. However, in making a one piece channel element, a sectionalized mandrel 34 (Fig. 10) is required, and the mandrel preferably also includes a retaining ring 35 which in Fig. 6 is illustrated about the outer periphery of the mandrel 34. Ring 35 may be uninterrupted or may be a split ring of suitable resilient material such as spring steel. The channel made from the wound form illustrated in Fig. 6 has outwardly extending flanges. Such a finished element is partly shown in cross section in Fig. 7. To make that channel, the wound form 36 is cut through the layers of crepe paper comprising the upper flat wall 37 on circular line 38, and cut through the layers comprising the lower flat wall 39 on line 41. These two cuts correspond radially with the outer peripheral edge of the sectionalized part of the mandrel, and as in making the angle shaped members a somewhat tubular part of the wound form is disjoined and can be pulled from the mandrel. In this instance the retaining ring 35 of the mandrel is also pulled off with the outer disjoined tubular wall of the wound form. Then the remaining part of the mandrel is dismantled and separated from the channel shaped element. For an outwardly flanged channel the sectionalized part of the mandrel need not be made of more than two pieces as the parts of the mandrel may be pulled radially away from the insulating element. The two pieces may have abutting edges only at the joints, 42 and 43 (Fig. 10).

Figures 7, 8, 9:
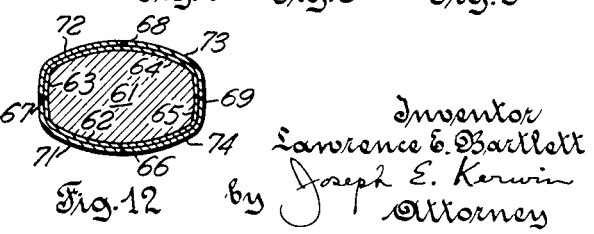
Fig. 7 is a view in cross section of part of a finished ring shaped channel element with outwardly extending flanges.
Fig. 8 is a cross sectional view of part of a wound form similar to that of Fig. 6.
Fig. 9 is a cross sectional view of part of the finished inwardly flanged channel made from the wound form illustrated in Fig. 8.

Figs. 8 and 9 show in cross section a part of the wound form from which an inwardly extending flanged channel can be made. In making the channel illustrated in Fig. 9, circular cuts are made through the layers of the upper and lower flat walls of the wound form on the circle 45 defined by the inside cylindrical surface of the mandrel. The inner tubular wall is thereby disjoined and can be removed.

After removing the inner tubular wall, the mandrel is separated from the remaining channel shaped part of the wound form. Parts 46 to 49, inclusive, of the mandrel have parallel sides and are pulled into the inner opening of the channel and then taken away. After one or more of those parts is removed, the others parts 51 to 54, inclusive, of the mandrel are loose and easily separated from the channel shaped insulating element. Ring 35, which must be a split ring, is then flexed and removed through the central aperture of the element. This remaining channel shaped element has its finished shape, and although it may be desirable to cut it into two or more segments so that it can be placed around a preformed disk coil, the cut segments will exactly fit together about the coil.

Fig. 12 illustrates another modified embodiment of this invention in which the strips of crepe paper are wound on a ring shaped mandrel 61 which has slightly bowed or convex sides 62, 63, 64 and 65. Around these curved sides the crepe paper may be wound under sufficient tension so that there are no voids between adjacent wound layers of the tape and so that the wound form need not be pressed between dies.

This wound form is cut on circular lines 66, 67, 68 and 69, respectively, at the center of the sides 62, 63, 64 and 65. Thus, four finished insulating angles 71, 72, 73, 74, are made on the one mandrel.

This invention provides economy, simplification and accuracy in making finished laminated insulating elements. The insulating elements are new and can be made from relatively narrow strips of paper formed into a solid flanged ring of angle or channel cross sectional shape. These new elements are laminated not only in superposed layers but within each layer the individual strips of paper that extend lengthwise in a generally radial direction in the finished elements have their adjacent edge portions overlapped.

As mentioned above, finished insulating elements made in accordance with this invention are utilized in reactors or transformers having winding stacks comprising superposed disk coils. For such apparatus the dimensions of the different angle or channel pieces will vary in the built up winding. Some of the elements may enclose a single coil while others enclose groups of coils with individually insulated coils nested in the groups. A considerable number of various sizes of the insulating elements having various lengths or widths of legs are required for the winding stack. By following the teaching of this invention any size insulating element can be quickly and economically made. The finished insulating elements made in accordance with this invention permit close control of electrical clearances by providing layer laminated crepe paper insulating elements.

The improved laminations of insulation increase the efficiency of the finished insulating elements by reducing the likelihood of weak spots in any part of that insulating element. The improvements are possible with relatively narrow width readily available crepe paper which resists cracking and hardening during drying out periods of the apparatus in which the insulating elements are embodied, and which is layered so as to readily absorb insulating oil by capillary action, so that the dielectric strength of the insulating elements is increased by eliminating voids within the insulated elements.

Other advantages of this invention, particularly the construction of the finished insulating element may be realized from the consideration of the angle shaped insulating element shown in Fig. 5. When embodied in a stack of disk coils, the flange of that element is positioned and clamped between adjacent superposed disk coils or solid insulating materials so that the flange is tightly held in place by its abutment against other parts of the winding stack. In addition, the flange is well bonded. Since the crepe paper preferably has a constant width, the overlap is greater at the inner periphery of the flange than at the outer periphery of that flange. The overlap tapers by an angle which diverges from the outer edge to the inner edge of the flange so that the inner edge is additionally overlapped for good bonding. Further, in applying the crepe paper to the mandrel, the paper is stretched so that the paper is substantially unwrinkled when it is radially wound.

When such insulating elements are in winding stacks, the wall of the element that extends axially (the tubular wall of the element) is not as tightly abutted and held as is the radial flange. Therefore, there is a possibility that unprotected ends of the tubular wall of the insulation will become loose. Loosening of those ends, however, is substantially prevented in the angle insulating elements made in accordance with this invention because of the girth wound strip on the outer tubular wall surface of the insulating elements. That strip not only reinforces the wall surface so that it will not bulge outwardly when the wound form is pressed and bonded but also holds the ends of the layered strip so that they will not become loose and unravelled.

Still other advantages of the construction of insulating elements made in accordance with this invention may be realized from a consideration of the finished elements shown in Fig. 12, which are made on the mandrel 61 which has convex sides. Making the elements 71 to 74, inclusive, on a mandrel having convex sides avoids the necessity of pressing the wound form between dies because the paper can be stretched and tightly applied layer upon layer. In addition, the finished insulating elements are an improvement in the art.

The angle between the side walls of these finished elements is greater than 90° so that the inside wall surface of each of the elements closely conforms to the outer surface of disk coils which conventionally have wrappings of insulation such as cable paper or cotton tape. The construction of these elements, which can be accomplished relatively fast and inexpensively in accordance with the method disclosed above, reduces the electrical stresses in the area of the corners of disk coils by reducing the cost and work of placing solid flanged insulation against such coils.

Although but a few embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. As an article of manufacture a preformed insulating collar adapted to be disposed in juxtaposition with only the edge portion of an electrical coil to provide insulation to ground for said coil, said collar comprising a flanged cylindrical member having an L-shaped cross section in a plane extending radially outward from the axis of the cylindrical portion of said member, said member comprising a plurality of layers bonded together, each said layer comprising a plurality of overlapped crepe paper strips, said strips extending lengthwise in a substantially radial direction in said flange portion of said member and in a substantially axial direction in the cylindrical portion of said member, the portion of each said strip overlapping an adjacent strip being stretched to a greater extent than the nonoverlapping portion to cause each said layer to be substantially voidless.

2. As an article of manufacture a preformed insulating collar adapted to be disposed in juxtaposition with only the edge portion of an electrical coil to provide insulation to ground for said coil, said collar comprising a flanged cylindrical member having an L-shaped cross section in a plane extending radially outward from the axis of the cylindrical portion of said member, said member comprising a plurality of layers bonded together, each said layer comprising a plurality of overlapped crepe paper strips, said strips extending lengthwise in a substantially radial direction in said flange portion of said member and in a substantially axial direction in the cylindrical portion of said member, the portion of each said strip overlapping an adjacent strip being stretched to a greater extent than the nonoverlapping portion to cause each said layer to be substantially voidless, and another strip of crepe paper bonded to the outer one of said layers around the cylindrical portion thereof to prevent said axially extending strips from unraveling and to maintain the cylindrical shape of said collar.

3. As an article of manufacture a preformed insulating collar adapted to be disposed in juxtaposition with only the edge portion of an electrical coil to provide insulation to ground for said coil, said collar comprising a flanged cylindrical member having a U-shaped cross section in a plane extending radially outward from the axis of the cylindrical portion of said member, said collar comprising a plurality of layers, each said layer comprising a plurality of overlapped crepe paper strips, said strips extending lengthwise in a substantially radial direction in said flange portion of said member and in a substantially axial direction in the cylindrical portion of said member, the portion of each said strip overlapping an adjacent strip being stretched to a greater extent than the nonoverlapping portion to cause each said layer to be substantially voidless, and another strip of crepe paper bonded to the outer one of said layers around the cylindrical portion thereof to prevent said axially extending strips from unraveling and to maintain the cylindrical shape of said collar.

References Cited in the file of this patent

UNITED STATES PATENTS

| | | |
|---|---|---|
| 1,118,446 | Roos | Nov. 24, 1914 |
| 1,500,472 | Scherner | July 8, 1924 |
| 1,631,668 | Briggs | June 7, 1927 |
| 1,799,580 | Burke | Apr. 7, 1931 |
| 1,944,508 | Gubler | Jan. 23, 1934 |
| 1,975,750 | Safford | Oct. 2, 1934 |
| 2,179,381 | Palmater | Nov. 7, 1939 |
| 2,354,500 | Camilli | July 25, 1944 |
| 2,479,400 | Pecoroni | Aug. 16, 1949 |
| 2,656,290 | Berberich et al. | Oct. 20, 1953 |

FOREIGN PATENTS

| | | |
|---|---|---|
| 680,890 | Great Britain | Oct. 15, 1952 |